United States Patent
Flannery et al.

[11] Patent Number: 6,015,963
[45] Date of Patent: Jan. 18, 2000

[54] PLASMA ARC FURNACE WITH IMPROVED REPLACEABLE ELECTRODES

[76] Inventors: Philip A. Flannery, P.O. Box 128, Ramsey, Mont. 59478; Jason McClafferty, 2511 Amherst; Donald A. Orne, 423 Hobson St., both of Butte, Mont. 59701

[21] Appl. No.: 09/244,150

[22] Filed: Feb. 4, 1999

[51] Int. Cl.[7] .................................................. B23K 9/00
[52] U.S. Cl. .................. 219/121.52; 219/121.37; 219/121.49; 219/121.52; 110/246; 373/20; 373/22
[58] Field of Search ............... 219/121.43, 121.58, 219/121.52, 121.36, 121.37; 110/246–250, 346; 373/22, 18, 20, 21

[56] References Cited

U.S. PATENT DOCUMENTS

| | | | |
|---|---|---|---|
| 4,466,824 | 8/1984 | Gauvin et al. | 75/10 R |
| 4,651,326 | 3/1987 | Hubweber et al. | 373/22 |
| 4,710,607 | 12/1987 | Wilhelmi et al. | 219/121.52 |
| 4,801,435 | 1/1989 | Tylko | 422/906 |
| 4,918,282 | 4/1990 | Cheek | 219/121.37 |
| 5,548,611 | 8/1996 | Cusick et al. | 373/18 |
| 5,734,673 | 3/1998 | Kurahashi et al. | 373/22 |

*Primary Examiner*—Mark Paschall
*Attorney, Agent, or Firm*—Peter Tribulski

[57] ABSTRACT

A plasma arc waste treatment furnace is equipped with a plasma arc torch having an electrode formed from a conductive refractory material. The refractory electrode can be operated at very high temperatures and does not need to be water-cooled. This eliminates a need for de-ionized water used in prior art furnaces. Arc erosion takes place very slowly and this results in long operating intervals of the furnace between shutdowns needed for electrode replacement. The electrode can be successfully operated as a cathode and this mode of operation improves melting efficiency.

7 Claims, 3 Drawing Sheets

PLASMA ARC FURNACE WITH IMPROVED REPLACEABLE ELECTRODES

FIELD OF THE INVENTION

The invention relates to extending performance life of and overall utility of plasma arc furnaces.

BACKGROUND OF THE INVENTION

Plasma arc furnaces are used in many industrial applications such as melting and heating masses of metal in the production of alloys. They are also used to heat and melt some industrial wastes in order to consolidate these wastes. Such an application of a plasma arc furnace is described in U.S. Pat. No. 5,731,564, issued Mar. 24, 1998 (Kujawa et al.).

Plasma torches used in these applications have metallic electrodes which are cooled with de-ionized water. These water cooled electrodes are the most vulnerable part of a plasma torch. Plasma arcs are initiated on these electrodes and the arc initiation regions are subject to relatively rapid erosion and wear. If erosion occurs at some concentrated area of the electrode, a leak will develop from the water cooling system. This type of failure causes very serious problems in a plasma arc furnace. It requires a shut-down of the furnace and a cooling of the entire system of molten materials and furnace. Only after cooling, can such a furnace be opened to gain access to the electrode so that it can be replaced. Electrode failures of this type result in shutdowns of furnaces which last for a number of days.

In prior art furnaces, it is necessary to break containment in order to change an electrode. If the furnace is being used to treat waste material containing toxic elements such as mercury, there is a need to perform expensive and complex purging operations before containment of the furnace is broken.

An electrode failure in prior art furnaces produces an even more severe problem when the waste materials being treated are radioactive. A cooling water leak into molten radioactive material produces vast amounts of radioactive steam which must be contained and treated. Additionally, there is a risk of an actual explosion. The risks associated with a possible leak has heretofore kept this form of plasma arc furnace waste treatment from being widely applied to radioactive materials.

This concern about cooling water leakage has produced frustration among those who seek effective methods for treating radioactive waste. A plasma arc furnace has a capability of treating waste in a highly contained environment. Additionally, plasma arc furnaces provide a method of reducing a great volume of waste into very compact and chemically stable rock-like objects. If the risk of cooling water leakage were to be eliminated, plasma arc furnaces would become a principal and very effective tool in the treatment of radioactive waste.

But even outside of the narrow field of radioactive waste treatment there is a need to eliminate the risk of cooling water leaks. Because such risks exist, normal operating procedures for plasma arc furnaces dictate that these furnaces be shut down periodically so that the electrodes can be replaced on a prophylactic basis. Because the life of an electrode is not entirely predictable, the interval of operation of a furnace between shutdowns is made relatively short. These shutdowns undermine the overall efficiency of plasma arc furnaces. Loss of efficiency appears to be a major factor in discouraging widespread acceptance of an otherwise promising furnace technology.

It is a goal of the present invention to provide a design for a plasma arc furnace with a reduced risk of cooling water leakage.

It is a further goal of the present invention to provide a plasma arc furnace which can be operated for long intervals without a need for shutdowns associated with torch electrode failure.

It is a still further goal of the present invention to provide a plasma arc furnace on which containment can be maintained while torch electrodes are replaced.

SUMMARY OF THE INVENTION

The present invention is directed to a plasma arc furnace which comprises a containment vessel and a plasma arc torch with a replaceable electrode. The plasma arc torch has a portion thereof extending through a wall of the containment vessel and outside the vessel. The plasma arc torch is configured so that the electrode can be replaced by removal through the portion of the torch extending outside of the containment vessel.

Viewed from another aspect, the present invention is directed to a plasma torch having improved operational life. The torch comprises a water-cooled body having a nozzle at one end thereof. An electrically conductive refractory electrode is inserted in the torch body. The electrode has an internal cylindrical surface formed therein upon which plasma arc initiation occurs. Plasma gas is introduced to the internal cylindrical surface. The electrode is electrically insulated from the torch body.

Viewed from still another aspect, the present invention is directed an electrode for a plasma arc torch. The electrode comprises a cylindrical rod of conductive refractory with a power attachment point at a first end thereof and a cylindrical opening formed in a second end, opposite the first end. The opening is coaxial with the rod. The rod has a length along its axis sufficient to accommodate replacement of the electrode within a torch by engagement with the first end.

The invention will be better understood from the following detailed description taken in consideration with the accompanying drawings and claims.

The drawings are not necessarily to scale.

DETAILED DESCRIPTION

Figure 1:
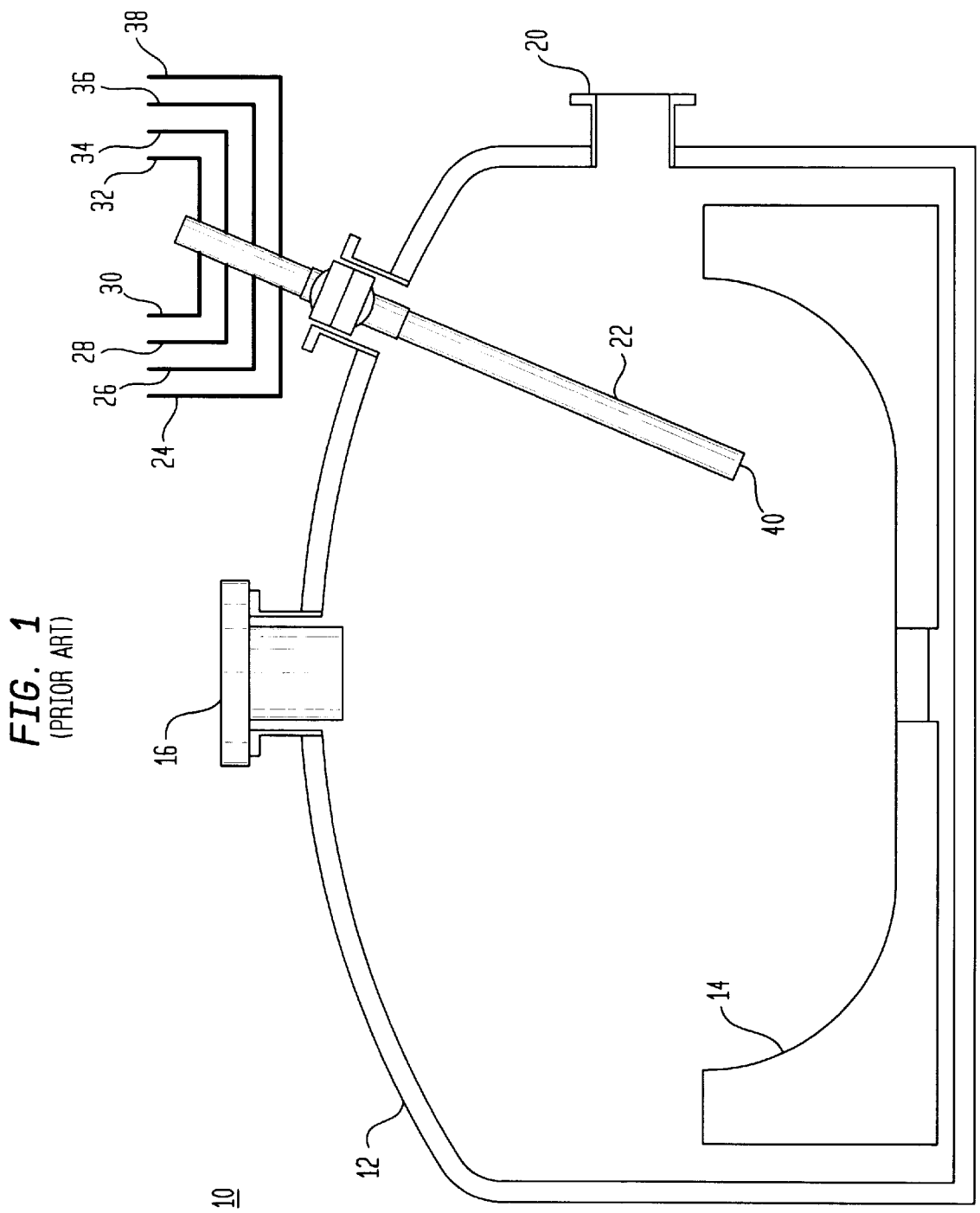
FIG. 1 shows a schematic cross-sectional view of a plasma arc furnace constructed in accordance with the prior art.

Referring now to FIG. 1, there is shown a cross-sectional view of plasma arc waste treatment furnace 10, constructed in accordance with the prior art. The furnace 10 comprises a chamber 12, a melting hearth 14, a material introduction port 16, a material removal port 18, an offgas port 20 and a plasma torch 22.

The prior art plasma torch 22 has a water cooled metallic electrode (not shown). Because of the nature of this water cooled electrode, the prior art torch 22 is provided with a multiplicity of connection members which are shown schematically in FIG. 1. The torch 22 is provided with eight connections, designated 24 through 38, respectively. Connection 24 is used to connect de-ionized water as a power ram cooling return. Connection 26 is for use as a torch gas supply. Connection 28 is used to connect de-ionized water as a nozzle cooling return. Connection 30 is used to connect de-ionized water as a torch body cooling return. Connection 32 is used to connect de-ionized water as a power ram cooling supply. Connection 34 is used to connect de-ionized water as a nozzle cooling supply. Connection 36 is used to connect de-ionized water as a torch body cooling supply. Connection 38 is for use as an electrical power supply.

The prior art torch 22, has a water-cooled hollow metallic electrode which must be replaced frequently. Water cooled hollow electrodes erode during use. In order to avoid risk of leakage of cooling water into the furnace 10, the hollow electrodes are replaced after a specified amount of running time, typically 50 to 100 hours.

The presence of the many torch connections 24 through 38, described above, has an effect on the manner in which the water cooled electrodes are replaced. With this large collection of connections, the torch 22 effectively becomes an integral part of the chamber 12. In other words, it is impracticably to remove the torch from the chamber because of the difficulty of removing and replacing the connections described above. Consequently, prior art furnaces are constructed with specialized removal systems for torches. These specialized removal mechanisms are designed to move a torch without making disconnections. However, when these mechanisms are used, they require a substantial opening in the wall of the furnace. For example, a dome of the furnace might be lifted and tilted to gain access to an output end of the prior art torch. Prior art electrodes are extracted from an output end 40 of the torch 22.

This complex method of replacing the water-cooled electrode produces some undesirable operating limits on the furnace 10. First of all, the period of operation of the furnace 10 is limited to the length of time between changes of the electrode. Secondly, there is a significant loss of operating time associated with each change of electrode. The furnace 10 must be allowed to cool before an electrode can be changed. After an electrode is replaced, the furnace 10, must be allowed to reach its full operating temperature. This cooling and re-heating can consume 15 to 24 hours. In the context of electrode life which can be as short as 30 hours, the time needed for electrode replacement is problematic.

Figure 2:
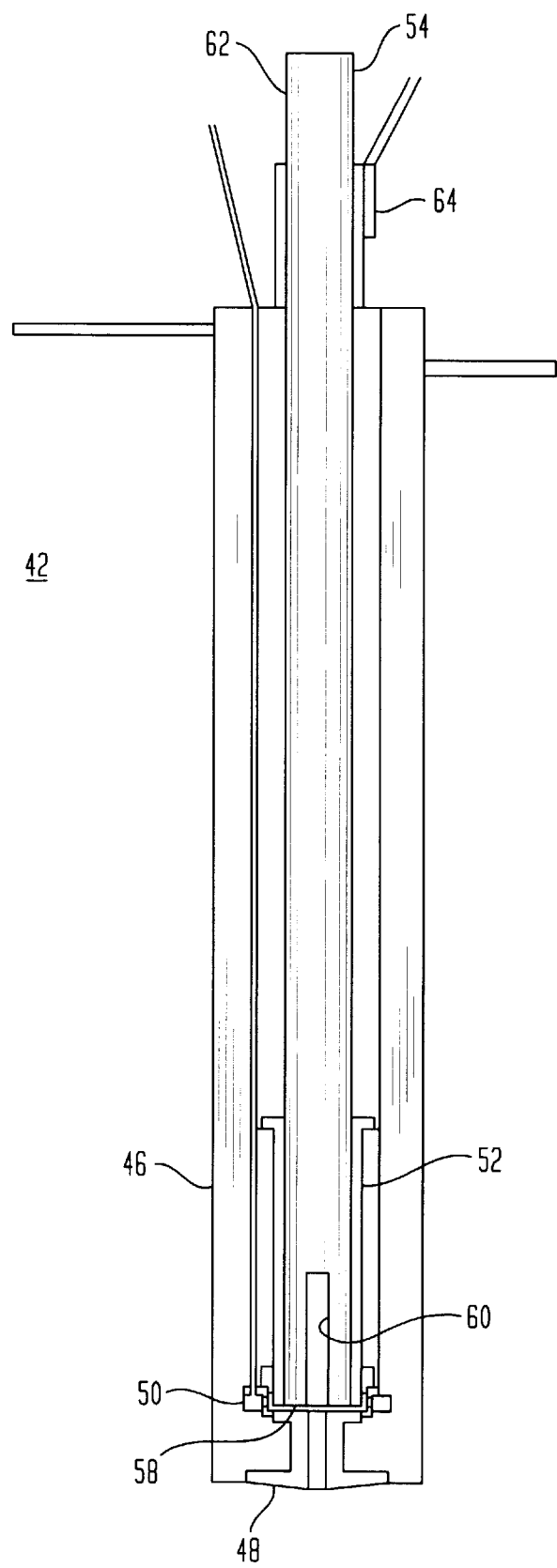
FIG. 2 is a cross-sectional view of a plasma arc torch constructed in accordance with the present invention.

Referring now to FIG. 2, there is shown a plasma arc torch 42 constructed in accordance with the present invention. The torch 42 comprises a water-cooled torch body 46, a nozzle 48, a torch gas injection ring 50, an insulating support 52 and a refractory electrode 54. The electrode 54 is a cylinder of conductive refractory material such as conductive ceramic, silicon carbide, molybdenum disilicide, graphite, tungsten, or hafnium. At an output end 58, the electrode 54 is provided with a cylindrical opening 60. This cylindrical opening 60 functions as an arc initiation chamber. At an input end 62, the refractory electrode 54 is connected to electrical power at a connection 64.

Figure 3:
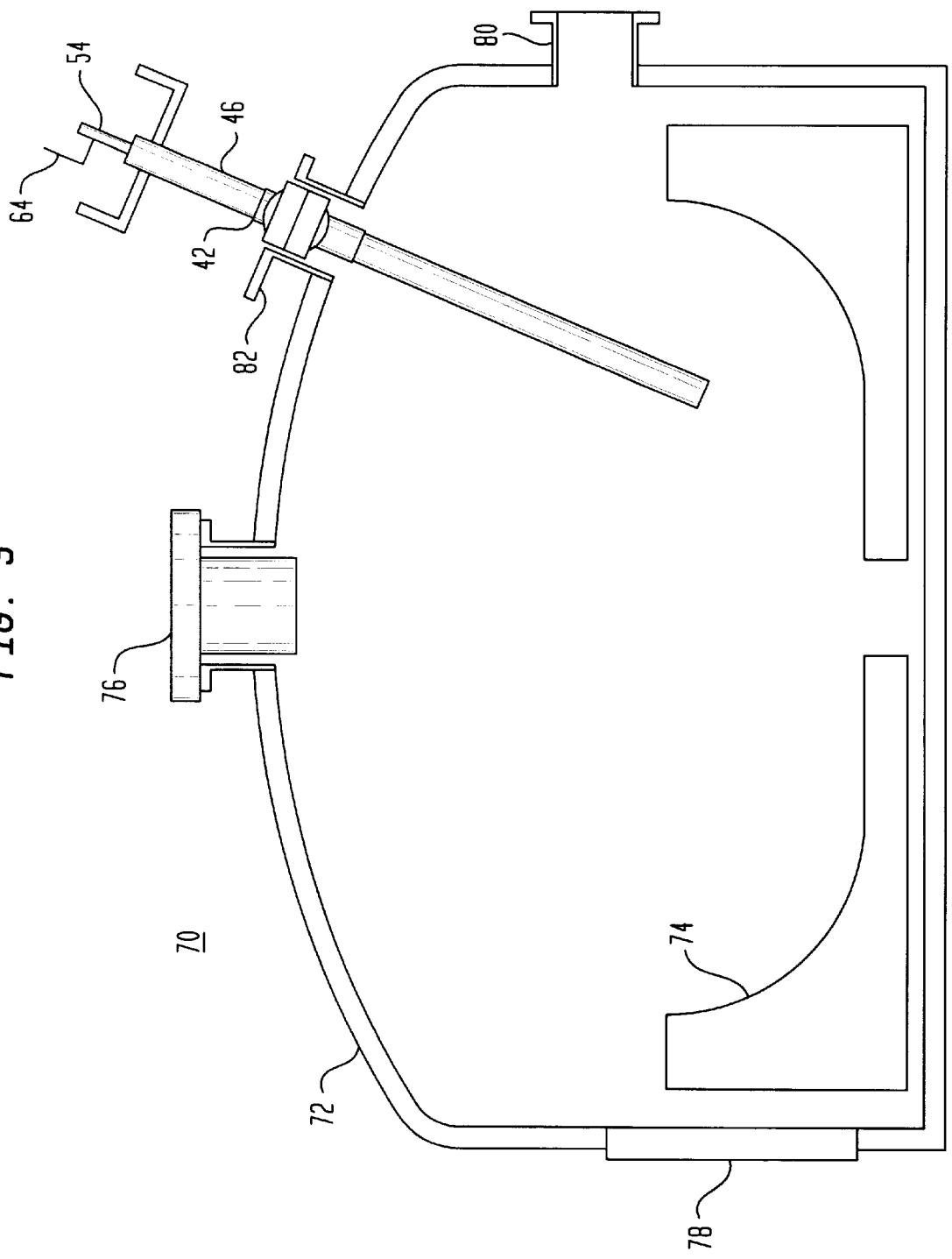
FIG. 3 is a schematic cross-sectional a plasma arc furnace constructed in accordance with the present invention.

Referring now to FIG. 3, there is shown a cross-sectional view of a plasma-arc waste treatment furnace 70 constructed in accordance with the present invention. The furnace 70 comprises a chamber 72, a melting hearth 74, a material introduction port 76, a material removal port 78, an offgas port 80 and the inventive plasma torch 44 of FIG. 3.

It can be seen in FIG. 3 that the electrode 54 of the torch 44 is accessible from outside the chamber 72. This illustrates one important feature of the present invention. The electrode 54 can be removed from the torch 44 without gaining access to the inside of the chamber 72. Thus the electrode can be replaced without a need to cool down the furnace 70. Indeed, the electrode 54 can be replaced without a need to even break containment of the furnace 70. This capability is provided through use of a slideable shutter 82 which can be closed when the electrode 54 is withdrawn. Employment of the shutter 82 provides for an opportunity to replace the electrode 54 without exposing the contents of the furnace 70 to the atmosphere surrounding the furnace 70.

It can be seen that the electrode 54 has no water or gas connections. It is connected only to electrical power at the connection 64. All other water and gas connections needed for operation of the torch 44 are made at the torch body 46. There is no need to extract the torch body 46 from the furnace 70 during an electrode replacement. Thus there is no need to cope with the complexity of water and gas connections.

Ease of replacement of the electrode 54 is only one of many advantages features of the present invention. An additional advantageous feature is that the torch 44 does not need to be cooled with de-ionized water. The electrode 54 is electrically insulated from the torch body with the insulating support 52 which is constructed from a high temperature polymer capable of withstanding temperatures of about 1000 F. In the prior art, metallic electrodes were placed at high electrical potentials and could only be water-cooled if the water was non-conductive, i.e., de-ionized. Supplying de-ionized water in large enough quantities to provide requisite cooling for waste treatment operations is costly and cumbersome. It is particularly cumbersome in circumstances where the waste treatment furnaces are operated at remote field locations which do not have sophisticated water de-ionization facilities.

Another valuable feature of the present invention is that the electrode 54 has a substantially higher operating life as compared with hollow metallic electrodes of the prior art. This higher operating life results from various characteristics of the electrode 54 and its mode of operation.

First of all, the electrode 54 can be operated at extremely high temperatures without concern for melting of its surface. The material molybdenum disilicide, for example can tolerate temperature of up to 3200 F. without adverse effects. This allows the electrode 54 to be operated without cooling. Consequently, the walls of the electrode 54 can be made much thicker than the walls of the prior-art, water-cooled metallic electrode. There is no need to accommodate heat transfer to cooling water with a thin wall. Thick electrode walls provide for longer operating life simply because there is more material which can erode before an electrode is worn out.

Secondly, the refractory electrode 54 runs hotter than prior art metallic electrodes. This results in an arc attachment point moving more readily around the surface of the arc initiation chamber 60 of FIG. 2. When the surface temperature of the arc initiation chamber 60 is uniformly high, a plasma arc can be easily moved to various points on the surface. Indeed, the arc initiation point is continuously moved through motion of gas that flows through the gas injection ring 50. (For further details of the mechanism of arc movement, refer to U.S. patent application Ser. No. 09/137,5599, pending [Cashell et. Al.] which is incorporated herein by reference). Because the arc initiation point moves around the entire hot surface of the chamber 60, there is an advantageous distribution of arc erosion across the entire surface. When arc erosion is distributed uniformly, overall life of the electrode 54 is improved. Typical failures of prior art electrodes occurred when arc erosion became concentrated in a small area.

Through use of conductive refractory as a material for the electrode 54, concern for arc erosion can be virtually set aside. In this context, it becomes practical to operate the torch 44 with straight polarity (i.e. with the electrode 54 as a cathode). This mode of operation has heretofore not been available for use in prior art plasma arc waste treatment furnaces.

Prior art furnaces have employed reverse polarity (electrode as an anode) because reverse polarity reduces arc erosion. Straight polarity is known to provide improved heat transfer and more efficient melting. But this advantageous mode of operation has not been used in prior art systems that employ metallic water cooled electrodes. In the prior art, the disadvantages of shortened electrode life have outweighed the advantages of more efficient melting.

The inventive furnace 70 can be readily operated with straight polarity with all of the attendant improvements in melting efficiency. This can be done without jeopardizing overall efficiency of the furnace 70. The electrode 54 can be operated for a long period of time (up to about 1000 hours) in a reverse polarity mode without a need for replacement. The additional arc erosion associated with straight polarity operation reduces this replacement interval, but the reduction is very modest. With straight polarity operation, the replacement interval for the refractory electrode 54 is about 950 hours, a period which is only a few percent lower than the reverse polarity interval.

When all of the advantageous features of the refractory electrode are combined, the inventive furnace 70 can be seen to represent a substantial improvement over the prior art.

It is to be appreciated and understood that the specific embodiments of the invention are merely illustrative of the general principles of the invention. Various modifications may be made by those skilled in the art which are consistent with the principles set forth. For example there are numerous conductive refractory substances which can be employed as material for the electrode 54.

What is claimed is:

1. A plasma arc furnace which comprises:

a containment vessel;

a plasma arc torch through which a cooling fluid flows;

the torch having a replaceable electrode constructed from a conductive refractory;

the electrode being isolated from contact with the cooling fluid;

the plasma arc torch having a portion thereof extending through a wall of the containment vessel and outside the vessel; and the plasma arc torch being configured so that the electrode can be replaced by removal through the portion of the torch extending outside of the containment vessel without interruption of flow of cooling fluid through the torch.

2. The furnace of claim 1 wherein the electrode material is conductive ceramic.

3. The furnace of claim 1 wherein the electrode material is selected from the group of silicon carbide, molybdenum disilicide, tungsten, hafnium and graphite.

4. The furnace of claim 1 wherein the electrode is operated with a polarity in which the electrode is a cathode.

5. The furnace of claim 1 wherein the electrode is electrically isolated form the torch and cooling of the torch can be performed with fluid which is electrically conductive.

6. A plasma torch having improved operational life which comprises:

a torch body through which a cooling fluid flows and having a nozzle at one end thereof;

an electrically conductive refractory electrode inserted in the torch body;

the electrode being isolated from contact with the cooling fluid;

the electrode having an internal cylindrical surface formed therein upon which plasma arc initiation occurs;

means for introducing plasma gas to the internal cylindrical surface; and means for electrically insulating the electrode from the torch body.

7. An electrode for a plasma arc torch through which a cooling fluid flows which electrode comprises:

a cylindrical rod of conductive refractory;

a power attachment point at a first end thereof;

a cylindrical opening formed in a second end, opposite the first end;

the opening being coaxial with the rod;

the rod having a length along its axis sufficient to accommodate replacement of the electrode within a torch by engagement with the first end; and the electrode being adapted to perform its function without contact with the cooling fluid.

* * * * *